United States Patent [19]

Göldner

[11] Patent Number: 4,555,137

[45] Date of Patent: Nov. 26, 1985

[54] BACK REST FOR A VEHICLE SEAT, PARTICULARLY A MOTOR VEHICLE SEAT

[75] Inventor: Walther Göldner, Denkendorf, Fed. Rep. of Germany

[73] Assignee: Keiper Recaro GmbH & Co., Fed. Rep. of Germany

[21] Appl. No.: 505,921

[22] Filed: Jun. 20, 1983

[30] Foreign Application Priority Data

Jun. 18, 1982 [DE] Fed. Rep. of Germany ....... 3222951

[51] Int. Cl.$^4$ .............................................. A47C 7/46
[52] U.S. Cl. ................................... 297/284; 297/460
[58] Field of Search .............. 297/284, 440, 452, 460; 5/446, 447

[56] References Cited

U.S. PATENT DOCUMENTS

| 2,894,565 | 7/1959 | Conner. | |
| 3,495,871 | 2/1970 | Resag et al. | 297/284 |
| 3,990,742 | 11/1976 | Glass et al. | 297/284 X |
| 4,097,087 | 6/1978 | Garavaglia | 297/284 |

FOREIGN PATENT DOCUMENTS 1160316 12/1963 Fed. Rep. of Germany.

Primary Examiner—William E. Lyddane
Assistant Examiner—Peter R. Brown
Attorney, Agent, or Firm—Wigman & Cohen

[57] ABSTRACT

With a back rest for a vehicle seat, particularly a motor vehicle seat, in order to be able to adjust the longitudinal profile on the side facing the seat user by means of a shaping body having a rigid shape, the shaping body (8) has support surfaces (17, 18) both on the side facing the upholstery (7) and on the side opposite the upholstery (7), which can be placed selectively in defined positions of the shaping body (8) relative to an upholstery support against support surfaces (15') of a support element (4). When one support surface (17) is in contact with the support surface (15') of the support element (4), the longitudinal profile is different than when the other support surface (18) is in contact with the support surface (15').

22 Claims, 12 Drawing Figures

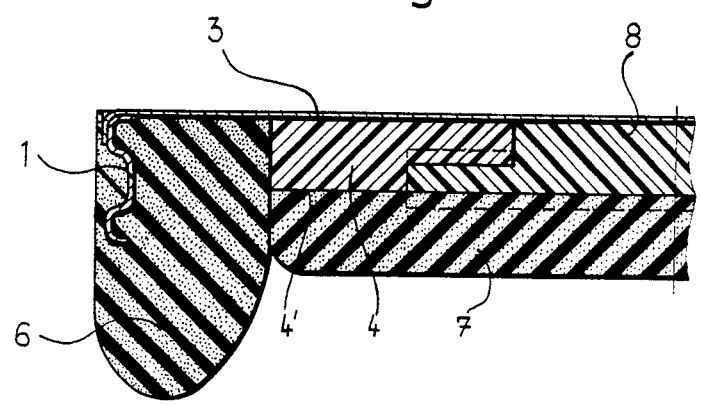
Fig. 1
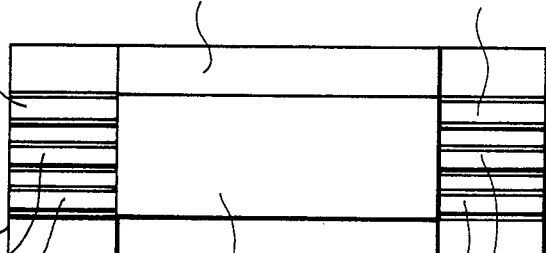
Fig. 6
Fig. 7
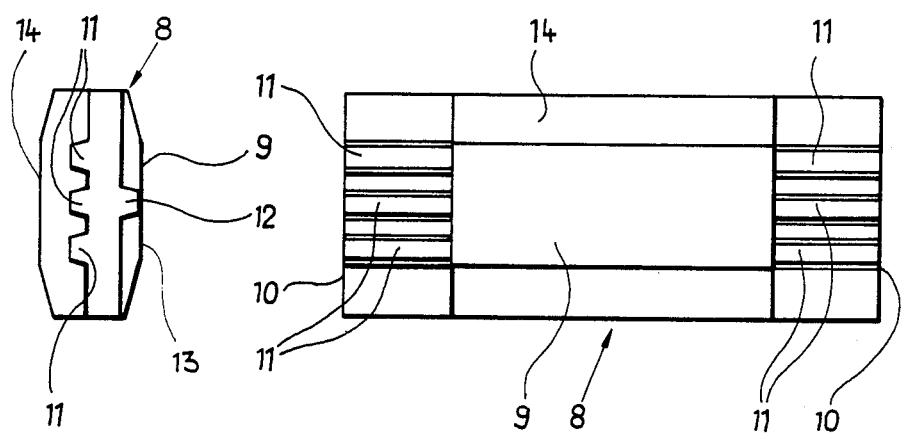

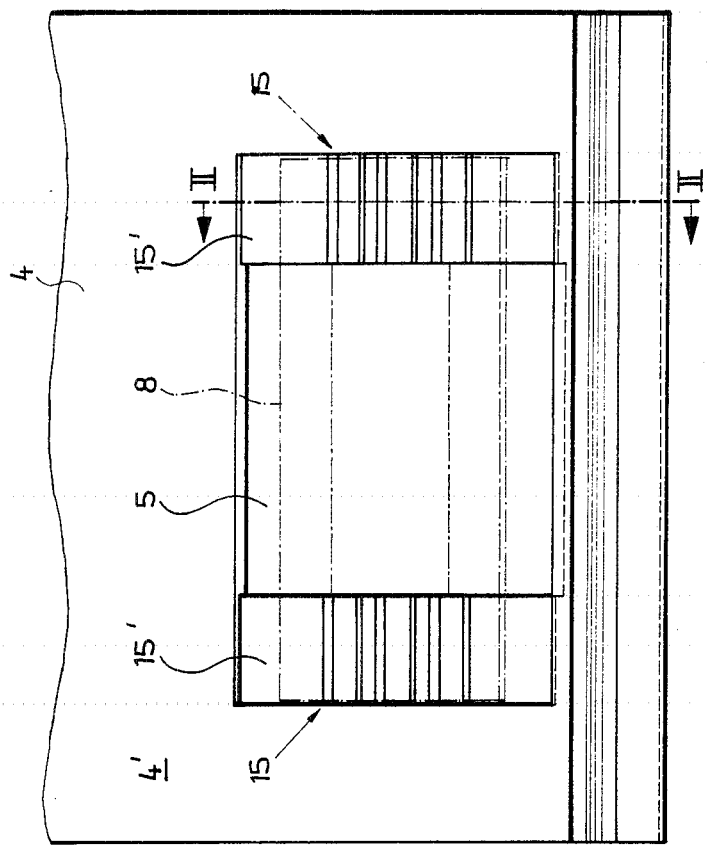
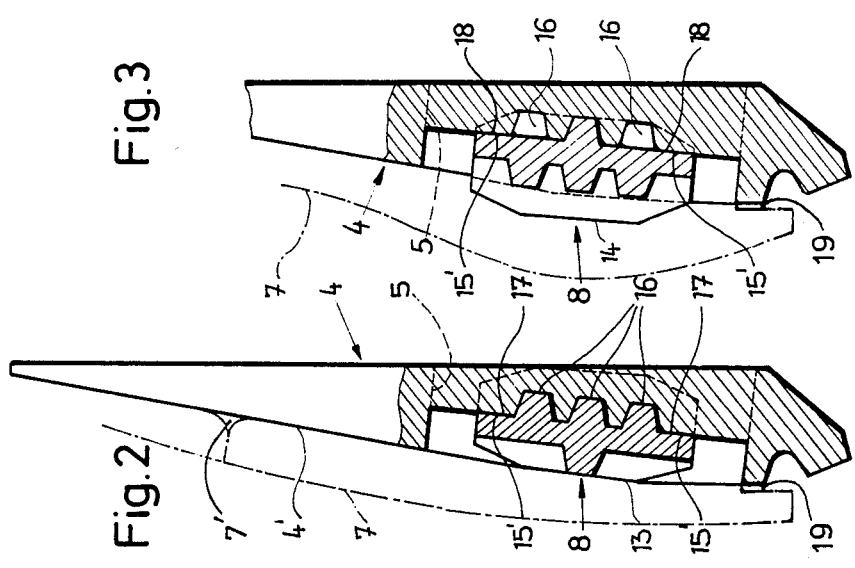

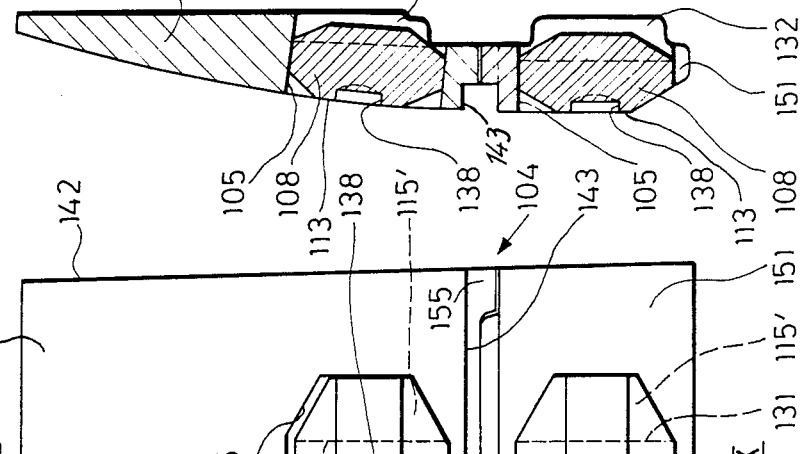
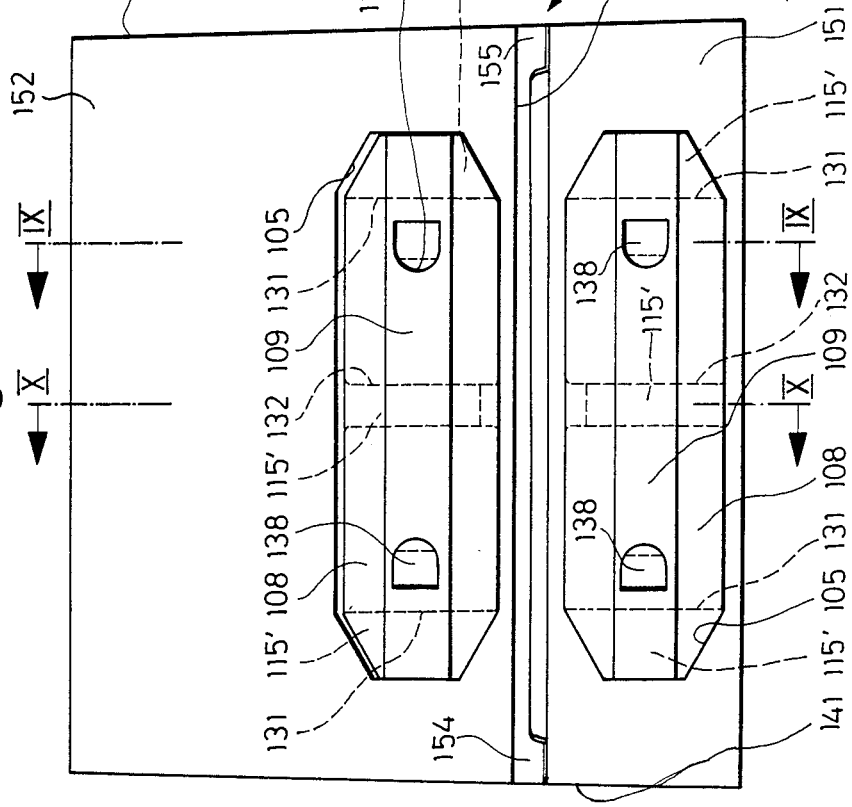
Fig.8
Fig.9
Fig.10

BACK REST FOR A VEHICLE SEAT, PARTICULARLY A MOTOR VEHICLE SEAT

BACKGROUND OF THE INVENTION

1. Field of the Invention

The invention relates to a back rest for a vehicle seat, particularly a motor vehicle seat, the upholstery support of which has a longitudinal profile on the side facing the upholstery, which is adjustable by means of at least one shaping body having a rigid or non-variable shape.

2. Description of the Prior Art

In known back rests of this type, the shaping body lies exchangably or non-exchangably between the upholstery and the upholstery support. It is held there in the desired position by means of a pocket or the like. A plurality of pockets arranged adjacent each other from the lower to the upper edge of the back rest enable the shaping body to be positioned at a selectable height. The disadvantages in this known system include not only the expense required for making the pockets and the difficulty of inserting the shaping body into the pocket or removing it therefrom but also the change in the longitudinal profile of the upholstery support which change requires, to the extent it does not result from a height adjustment of the shaping body, shaping bodies having different profiles that are expensive and increase storage costs. In addition, extra shaping bodies delivered as replacements can be lost.

SUMMARY AND OBJECTS OF THE INVENTION

The object of the invention is to create a back rest of the above-described type, in which the longitudinal profile of the upholstery support can be adjusted to meet given requirements with minimal expense. This object is achieved by a back rest having the characteristics of the invention.

Because two different longitudinal profiles or shapes of the upholstery support can be provided by means of a single shaping body, according to the back rest of the invention, in many cases the required availability of additional shaping bodies is unnecessary, which significantly decreases the expense. As a rule, it will be advantageous to form these single shaping bodies in such a manner that, when one abutment surface is in contact with the support surface, the longitudinal profile has a more severe curvature toward the back of the seat user than when the other abutment surface is in contact therewith. The latter case provides the longitudinal shape that is correct in most instances.

In a preferred exemplary embodiment, the element of the upholstery support which forms the support element is a plate-like body, the support surface of which, facing the upholstery, is shaped according to the desired longitudinal shape of the upholstery support, except for the area covered by the shaping body. The area covered by the upholstery body therefore is preferably formed as at least one depression made to accomodate the shaping body in question. If such a depression is adapted in its size to that of the shaping body, then no further means are necessary in order to hold the shaping body in the desired position.

But, even when such a depression is formed such that it permits a height adjustment of the shaping body, the shaping body can be held in the desired position using simple means. The two abutment surfaces of the shaping body can namely include detent elements which cooperate with detent elements in the area of the support surface of the support element. It is preferred that these inter-engaging elements are fillets and grooves running laterally along the back rest, since such elements are simple to manufacture, even when the shaping body and the support element are made of plastic, particularly a hard polystyrene foam, as is the case in a preferred exemplary embodiment.

The arrangements of these fillets and grooves is preferably selected in such a manner that, at least when one of the two abutment surfaces is in contact with the support surface, the fillets can be brought into engagement with the grooves at different height adjustments of the shaping body.

The longitudinal shape of the back rest can be formed in a particularly variable manner, even without the use of a depression which permits a height adjustment of the shaping body and without having to maintain an available stock of different shaping bodies, when, according to an advantageous exemplary embodiment, two spaced, vertically stacked depressions, which are directed toward each other, are present in the support element, of which each is provided for the support of one of two identically formed shaping bodies. The depressions and the shaping bodies, the cross sections of which are formed to adapt to the depressions, can be relatively narrow in this case. This means that depression-free longitudinal areas are available of sufficient extent on the support element, into which a cross bar or cross beam can extend from one longitudinal beam to the other longitudinal beam of the upholstery support. In an advantageous exemplary embodiment, a groove is formed in the support element for this purpose in the area between the two depressions to receive the cross bars. In order to simplify the removal of a shaping body from the depression, particularly when the depression does not allow for height adjustments in which the shaping body is tightly received, in a further exemplary embodiment, it is provided that gripping holes are formed in at least one abutment surface of the shaping element.

BRIEF DESCRIPTION OF THE DRAWINGS

The invention is described in greater detail below with the aid of two exemplary embodiments illustrated in the drawings.

FIG. 1 is a partially illustrated cross section of the first exemplary embodiment, FIG. 2 is a longitudinal section of the support element of the first exemplary embodiment with the shaping element placed in a first position in the support element, FIG. 3 is a longitudinal section of the support element and the shaping body of the first exemplary embodiment in place in another position, FIG. 4 is a partially illustrated top view of the side of the support element facing the upholstery in the first exemplary embodiment, FIG. 6 is a front view of this shaping body, FIG. 7 is a top view of one of the two sides of the shaping body which can face the upholstery in the first exemplary embodiment, FIG. 8 is a top view of the side of the support element facing the upholstery in a second exemplary embodiment having shaping bodies placed in a first position in the support element, FIGS. 9 and 10 are sections along the lines IX—IX and X—X in FIG. 8.

DETAILED DESCRIPTION OF THE PREFERRED EMBODIMENTS

Figure 5:
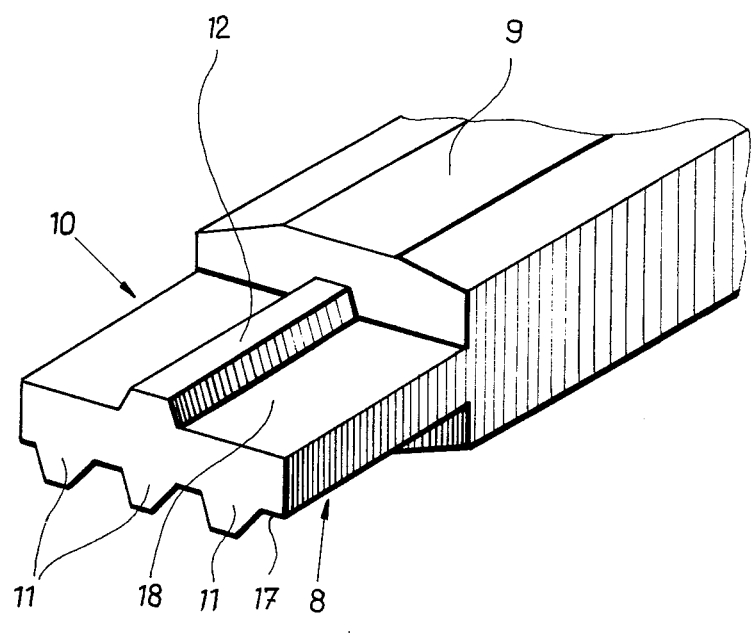
FIG. 5 is a paratial and perspective view of the shaping body of the first exemplary embodiment.

FIGS. 1 through 7 illustrate a first exemplary embodiment of a back rest for a motor vehicle seat. It includes two mirror-image longitudinal beams 1, which are pivotably connected near their lower ends in a known manner with a seat frame, in order to be able to adjust the back rest into selectable reclining positions and lock it in this position. A cross beam (not shown) extends in the lateral direction of the back rest from the upper end of one longitudinal beam 1 to the corresponding end of the other longitudinal beam 1. A metal plate 3 or other plate made of a different material lies on the back side of the frame-like portion of the upholstery support of the back rest formed by the two longitudinal beams 1 and the cross beam. The side edges of the metal plate 3 are rigidly connected with the longitudinal beams 1 formed as metallic shaped rails, so that the upholstery support has the shape of a shell.

A support element 4 is symmetrically arranged between the two longitudinal beams 1, which support element 4 consists of a hard polystyrene foam and is fixed to the metal plate 3. The support element 4, which has the form of a rectangular plate, is provided in its lower half with a rectangular depression 5, which ends at a distance from the lower edge and at equal distances from the two lateral edges of the support element 4. The depression 5 lies in the area of the back rest directed toward the upper edge of the pelvis and the lower spine.

As shown in FIG. 1, the back rest includes upholstered side cheeks 6, which are supported by the respective longitudinal beams 1 and which lie with their back sides against the metal plate 3. The width of the support element 4, as also shown in FIG. 1, is selected so that it fills the intermediate space between the side cheeks 6. Its front side 4' facing the back of the seat user therefore forms the contact surface for the center portion 7 of the lower back upholstery provided with a covering, at the sides of which are located the side cheeks 6.

As shown in FIGS. 2 and 3, the support element 4 has a wedge-like longitudinal profile. This longitudinal profile is selected such that the back of the seat user experiences a good orthopedic support and the back rest forms the necessary lower back support. In order to be able to change the longitudinal profile of the back rest at the height of the lower spine and the upper edge of the pelvis and thereby be able to adapt to different people, a shaping body 8 made of hard polystyrene foam is also provided in the first exemplary embodiment, which shaping body 8 is located in the depression 5 and determines the longitudinal profile of the back rest in this area, i.e. at the height of the lower spine and the upper edge of the pelvis.

As shown particularly in FIGS. 5 through 7, the shaping body 8 has a square-shaped center portion 9 having a cross-sectional surface consisting of a rectangle and respective trapezoids joining at opposite sides of the rectangle. Identically formed end sections 10 join in one piece to the two frontal sides of the center portion 9 having the same shape. As shown particularly in FIGS. 5 and 6, these end sections 10 have the shape of a rectangular plate, at the opposite large side surfaces of which are formed fillets 11 and 12 in one piece therewith. These fillets 11 and 12 all have a similar, trapezoidal cross-sectional shape and extend from the center portion 9 to the free-lying frontal surface of the end section 10. As shown particularly in FIG. 6, in the body 8 of the first exemplary embodiment, three fillets 11 are provided at equal distances adjacent one another on one side, while the other side has only a single fillet 12, which is aligned with the center of the fillets 11, but could also have a different position.

As can be clearly recognized in FIG. 6, the end sections 10 are displaced out of the center plane toward one of two support surfaces 13 or 14 of the center portion 9. As best shown in FIGS. 2 and 3, the body 8 provides the support for the center portion 7 of the upholstery, depending on how the body 8 is placed in the depression 5. Although the two support surfaces 13 and 14 have the same shape and have a slightly trapezoidal profile, because of this displacement, the longitudinal profile of the back rest in the area determined by the body 8 is dependent on whether the support surface 13 or the support surface 14 is directed toward the back of the seat user. In the latter case, the curvature of the longitudinal profile effected by the body 8 toward the back of the seat user is clearly greater than when the support surface 13 faces the back of the seat user.

In its central area which receives the center portion 9 of the body 8, the depression 5 is formed as an opening. The dimensions thereof in the lateral direction of the back rest are adapted to the corresponding dimension of the center portion 9 of the body 8. In contrast, the dimension of the opening in the vertical direction of the back rest is greater than the corresponding dimension of the body 8, which fact is also true for the two side areas of the depression 5, so that the body 8 can be placed at various levels in the depression 5.

As shown in FIGS. 2–4, two identically formed side areas 15 of the depression 5 are adapted in their width, as measured in the lateral direction of the back rest, to the width of the end sections 10 measured in this direction. The body 8 is therefore protected against movement in the lateral direction of the back rest when it engages in the depression 5. As shown particularly in FIGS. 2 and 3, a support surface 15', which lies at a lower level and faces the back of the seat user, is provided with three grooves 16, the cross-sectional shapes of which are adapted to the cross-sectional shapes of the fillets 11 and 12. In addition, the distance from each other of these grooves 16, which run in the lateral direction of the back rest, is selected to correspond to the distance of the fillets 11 from each other. Therefore, when the support surface 13 of the body 8 is directed toward the back of the seat user, all of the fillets 11 engage completely in the grooves 16, so that an abutment surface 17 which supports the three fillets 11 lies on the support surface 15' of the side area 15. The longitudinal profile of the back rest in the area of the rectangular depression 5 then has the form seen in FIG. 2.

If the fillets 11 engage in the groove 16, then the body 8 can only be placed into the depression 5 in a single height setting. If, in contrast, the support surface 14 is directed toward the back of the seat user, then the fillet 12 can selectively be placed in one of the three grooves 16, whereby an abutment surface 18 which supports these fillets 12 lies against the support surface 15'. This means that, in achieving a more severe curvature of the longitudinal profile in the area of the lower spine and the upper edge of the pelvis, the height adjustment can be changed in three stages by means of the body 8 and thereby can be adapted to various requirements.

Of course, it would also be possible by adding additional grooves 16 to make a height adjustment of the body 8 even when the abutment surface 17 lies against the support surface 15'. By means of the first exemplary embodiment, however, a single height adjustment can be defined in a simple manner for the one setting position of the body 8, even when a height adjustment is possible in the other setting position.

To the extent that a subsequent change of the longitudinal profile of the back rest is desired, it is sufficient to form the upholstery 7 of the back rest in such a manner that the center portion 9 can be removed from the upholstery support at any time at least to such an extent that the body 8 is accessible. As a result of the trapezoidal shape of the fillets 11 and 12 as well as the grooves 16, a reliable connection between the body 8 and the support element 4 can be achieved without additional connecting means and without making it too difficult to release the body 8 and the elements 4 from each other.

As shown in FIG. 2, the upholstery 7 has a bending line 7' somewhat above the upper edge of the depression 5. Line 7' extends over the entire width of the upholstery 7 and is formed in the exemplary embodiment by a lateral seam. From this bending line 7' out to the lower end, the upholstery 7 is not connected with the support element 4 or the upholstery support (not shown) along its two side edges.

In contrast, as shown in FIGS. 2 and 3, along the lower edge of the upholstery 7 is attached a strip-like adhesion closure element 19, which, together with a corresponding adhesion closure element 19 attached to the front side of the support element 4 and directed toward the strip-like adhesion closure element 19, results in a releasable connection between the upholstery 7 and the support element 4. Of course, a different closure, for example, a zipper, could also be provided instead of the adhesion closure element 19. In order to gain access to the body 8, a seat user needs only release the upholstery 7 from the support element 4 at its lower edge and then fold it forward and upward about the bending line 7'.

In FIGS. 8 through 12, with the aid of a second exemplary embodiment of the back rest which is described below, elements corresponding to portions of the first-described exemplary embodiment are designated with reference numerals increased by one hundred. In so doing, in the second exemplary embodiment, only the support element 104 and its associated shaping bodies 108 are illustrated in the drawings, of which two are present but formed identically. The elements of the upholstery support of the second exemplary embodiment of the back rest not shown in FIGS. 8 through 12 can be formed in the same manner as with the first-described exemplary embodiment, i.e. they can form an upholstery support in the shape of a shell having longitudinal side beams and cross bars or cross beams connecting the longitudinal side beams 1. The support element 104 and the shaping body 108, as in the first exemplary embodiment, are made of a hard polystyrene foam.

A first basic difference of the second exemplary embodiment according to FIGS. 8 through 12 relative to the first exemplary embodiment according to FIGS. 1 through 7, is that the support element 104 has two depressions 105 arranged symmetrically to the longitudinal center line and spaced from each other, which depressions 105 are identically formed. Respective shaping bodies 108 can be placed in each of the depressions 105. The two depressions 105, which completely penetrate the support element 104 over the greater portion of their length, lie in the area of the back rest directed toward the upper edge of the pelvis of the user's body and the area thereabove. The shape of the depressions 105 is adapted to the shape of the cross-sectional surface of the bodies 108. As can be seen in FIG. 8, this cross-sectional surface is comprised of a central, longitudinally extending rectangular surface having laterally adjoining trapezoidal surfaces at both sides, whereby the longer, parallel sides of the trapezoidal surfaces coincide with the short sides of the central rectangular surface. The depressions 105, as already mentioned, are not formed so that they completely spread over their entire length, but rather have floor areas 131 which form the bottom of the depression 105 in the side end areas, as well as respective, central cross ribs 132 at the bottom of the depressions 105. The cross-sectional surface of the side floor areas 131 corresponds to the trapezoidal surface of the side end areas of the bodies 108. The surfaces of the floor areas 131 and the ribs 132 facing the associated body 108 lie in each depression 105 in a common plane and serve as support surfaces 115', on which associated support surfaces of the body 108 placed in the associated depression 105 are supported.

Figure 11:
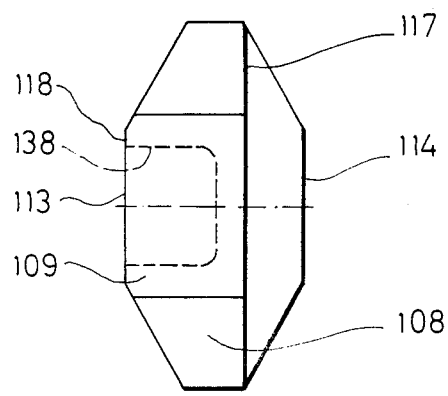
FIG. 11 is a front view of a shaping body of the second exemplary embodiment.
Figure 12:
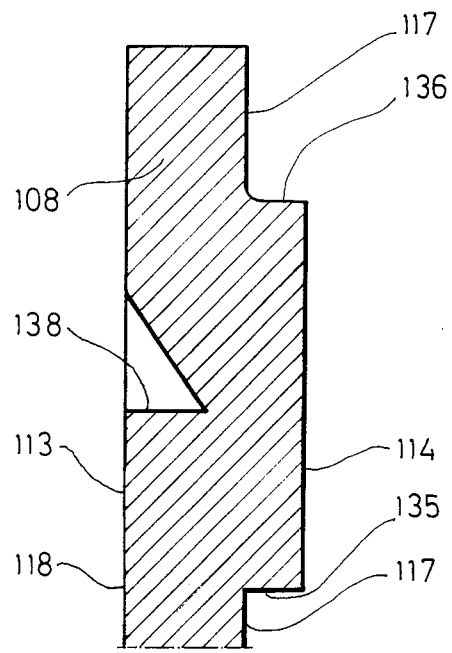
FIG. 12 is a partially illustrated, longitudinal central section of the shaping body of FIG. 11.

Each body 108 has, as particularly shown in FIGS. 8 and 11, a square-like center portion 109 having a cross-sectional surface consisting of a rectangle and respective trapezoids adjoining on opposite sides of the rectangle. If the body 108 is placed in the associated depression 105 in the position in which its support surface 113 faces the upholstery of the back rest, then the body 108 lies with its abutment surfaces 117 against the support surfaces 115' of the depression 105. As shown in FIG. 12, the abutment surfaces 117 are formed by the base of a central, laterally running groove 135, which is formed in support surface 114 of the body 108, and by lateral recesses 136 at the end areas of the molded body 108. When the body 108 is in place, the abutment surfaces 117 of the lateral recesses 136 lie against the support surfaces 115' of the floor areas 131, and the abutment surface 117 of the groove 135 lies against the support surface 115' of the cross rib 132, which is contained in the groove 134. If, in contrast, the body 108 is in place in the associated depression 105 in the other position, where its support surface 114 faces the upholstery of the back rest, the abutment surface 113, which simultaneously serves as support surface 118, lies against the support surfaces 115' of the associated depression 105. As can be seen particularly from FIGS. 11 and 12, the abutment surface 117 is inwardly displaced relative to the abutment surface 114 of the body 108, while the other support surface 118 coincides with the support surface 113. Because of this displacement, the longitudinal profile of the back rest in the area determined by the body 108 is dependent on whether the support surface 114 or the support surface 113 is facing the upholstery 7 of the back rest, i.e. the back of the seat user.

When the body 108 is thus placed in the depression 105 in such a manner that the support surface 114 faces the back of the seat user, it is not at all difficult to remove the body 108, because it can be comfortably gripped through the central groove 135 and one of the lateral recesses 136. In order to make the accessibility equally comfortable when the body 108 is placed in the other position, where it faces the user with its uninterrupted smooth support surface 113, two gripping holes 138 are provided in the support surface 113, one of which is arranged near each lateral end area of the body 108, respectively.

An additional significant difference of the second exemplary embodiment according to FIGS. 8 through 10 relative to the first-described exemplary embodiment is that the support element 104 has a laterally running groove 143 which extends from one side edge 141 to the other side edge 142 of the support element 104 and is open toward the front, i.e. toward the side of the support element 104 facing the seat user. In the second exemplary embodiment illustrated here, the support element 104 is formed in two pieces and includes a lower support element 151, in which the lower depression 105 is arranged approximately in the center, relative to the height of the support element 151. Support element 104 also includes upper support element 152 adjoining the support element 151 at the top thereof. In so doing, the two support elements 151 and 152 lie against each other in the area of the base of the groove 143. As can be seen particularly in FIG. 8, the impact point on the base of the groove 143 does not run straight, but rather in such a manner that the upper support element 152 forms the entire base of the groove 143 in the areas 154 and 155 adjacent the side edges 141 and 142, respectively, of the support element 104, while the lower support element 151 only participates in the further inward longitudinal section of the groove 143 in forming the base or floor of the groove 143. This results in a toothed arrangement of the impact points between the upper and lower support elements 151 and 152, so that the contacting support elements 151 and 152 are secured relative to each other against lateral movement. The groove 143 is provided to receive a cross bar or a shaft connecting the longitudinal beams 1 shown in FIG. 1 of the upholstery support.

All characteristics mentioned in the above specification as well as the characteristics which can be taken only from the drawings are elements of the invention as additional embodiments, even if they are not particularly emphasized and not particularly mentioned in the claims.

These embodiments of the present invention are considered illustrative only since other modifications will be readily discerned by those skilled in the pertinent art. In any event, the scope of the invention is intended to be covered by both the letter and the spirit of the claims appended hereto.

We claim:

1. A back rest for a vehicle seat, comprising:
   an upholstery support having a support surface;
   a shaping body; and
   upholstery supported by the upholstery support which has an adjustable longitudinal profile on a side facing a seat user, which profile is adjusted by the shaping body;
   said shaping body having a first profile on a first abutment surface and a second profile on a second abutment surface;
   said shaping body adapted to be placed selectively in defined positions between the upholstery support and the upholstery;
   means in the support surface for selectively cooperating with the profiles of the abutment surfaces, whereby when the first abutment surface contacts the support surface of the upholstery support, a first longitudinal profile is formed by the second abutment surface of the shaping body and the support surface and when the second abutment surface contacts the support surface of the upholstery support a second profile is formed by the first abutment surface of the shaping body and the support surface.

2. Back rest according to claim 1, wherein the profiles are formed by abutments provided at different distances from respective sides of the shaping body, so that when one abutment surface contacts the support surface of the upholstery support, the longitudinal profile defined thereby has a more severe curvature toward the back of the seat user than when the other abutment surface contacts the support surface of the upholstery support.

3. Back rest according to claim 1, wherein the upholstery support is a plate-like body, the support surface of which facing the upholstery is shaped according to a desired longitudinal profile of the upholstery support, with the exception of an area thereof covered by the shaping body.

4. Back rest according to claim 3, wherein the area of the upholstery support covered by the shaping body is formed as at least one depression which accomodates the shaping body.

5. Back rest according to claim 4, wherein;
   each depression has the shape of a rectangle extending in the lateral direction of the back rest; and
   depressed support surfaces of the upholstery support are formed by two side edge zones of each depression.

6. Back rest according to claim 5, wherein the shaping body has an abutment adapted to the shape of each depression and the width of side end sections, which form displaced abutment surfaces, is adapted to the width of the two side edge zones.

7. Back rest according to claim 5, wherein in each of the two side edge zones, three grooves are provided and the side end sections support three abutments on one side and one abutment on the other side.

8. Back rest according to claim 4, wherein the upholstery support has two depressions which are arranged displaced relative to each other in the vertical direction of the back rest, which are aligned with each other, and which are at least basically identical to receive two respective identically formed shaping bodies.

9. Back rest according to claim 8, wherein:
   each depression has a shape of a rectangle extending in the lateral direction of the back rest and has trapezoidal side edge zones;
   a depressed abutment surface is formed by floor areas which define a base of each depression in two side edge zones of each depression, said depressed abutment surface is also formed by a surface of an abutment which runs laterally in a central area of each depression; and
   said surface of the abutment lies in the same plane as the floor areas.

10. Back rest according to claim 9, wherein:
    each shaping body has a shape and a size adapted to the two depressions;
    one abutment surface of the shaping body, provided to cooperate with the support surface of the upholstery support, conforms to the support surface of the upholstery support;

the one abutment surface of the shaping body is formed by a base of a laterally running groove which is provided to contain the abutment;

said groove is formed in the abutment surface facing the upholstery in a central portion of the shaping body; and said groove is also formed by depressed surfaces of recesses on the side edge zones of the shaping body, which depressed surfaces lie in the same plane with the base of the groove.

11. Back rest according to claim 10, wherein gripping hole means are formed in the abutment surface of the shaping body.

12. Back rest according to claim 1, wherein the two abutment surfaces of each shaping body are provided in an area of two side end sections thereof and include first detent elements which cooperate with second detent elements in the cooperating means of the support surface of the upholstery support.

13. Back rest according to claim 12, wherein the first and second detent elements interengage and are formed as fillets and grooves, respectively, running in the lateral direction of the back rest, which fillets and grooves have trapezoidal cross-sectional profiles.

14. Back rest according to claim 13, wherein the fillets and grooves can be brought into engagement with each other in different height settings of each shaping body at least when one abutment surface contacts the support surface of the upholstery support.

15. Back rest according to claim 1, wherein the shaping body and the upholstery support are made of hard polystyrene plastic foam.

16. Back rest according to claim 1, wherein the upholstery is detachably connected in an area of the upholstery support element and the upholstery support.

17. Back rest according to claim 1, wherein one of an adhesion closure element and a zipper is provided as a detachable means for connecting together the upholstery and the upholstery support.

18. Back rest according to claim 17, wherein the upholstery is unconnected with the upholstery support at its sides from its lower edge up to a height above an upper edge of an uppermost shaping body.

19. Back rest according to claim 1, further comprising a bending line of the upholstery which bending line extends laterally across the upholstery.

20. Back rest according to claim 1, wherein, in the upholstery support, a groove is provided which runs completely from one side edge to the other side edge thereof and an opening of the groove is open toward the upholstery.

21. Back rest according to claim 20, wherein the groove is arranged in an area between two depressions.

22. Back rest according to claim 21, wherein the upholstery support is formed of a lower, plate-like support element fitted into one of the two depressions and of an upper support element, adjoining an upper end of the lower support element, said upper support element being fitted into the other of the two depressions.

* * * * *

UNITED STATES PATENT AND TRADEMARK OFFICE
CERTIFICATE OF CORRECTION

PATENT NO. : 4,555,137
DATED : November 26, 1985
INVENTOR(S) : WALTHER GOLDNER

It is certified that error appears in the above—identified patent and that said Letters Patent is hereby corrected as shown below:

Claim 16, Column 10, line 6, delete "element and the upholstery support".

Signed and Sealed this

Eighteenth Day of March 1986

[SEAL]

Attest:

DONALD J. QUIGG

Attesting Officer

Commissioner of Patents and Trademarks